United States Patent Office 3,808,326
Patented Apr. 30, 1974

---

3,808,326
PREPARATION OF ZEOLITES

Carl V. McDaniel, Laurel, Philip K. Mather, Baltimore, and Joseph M. Pilato, Silver Spring, Md., assignors to W. R. Grace & Co., New York, N.Y.
No Drawing. Continuation of application Ser. No. 126,323, Mar. 19, 1971, which is a continuation of application Ser. No. 738,116, June 19, 1968, now abandoned. This application Dec. 4, 1972, Ser. No. 311,990
Int. Cl. C01b 33/28
U.S. Cl. 423—329                    10 Claims

ABSTRACT OF THE DISCLOSURE

Crystalline aluminosilicate zeolites are rapidly and efficiently prepared by seeding an aqueous mixture containing alumina, silica, and alkali metal hydroxide with zeolite seeds, i.e. nucleation centers having an average size below about 0.1 micron.

---

This application is a continuation of application Ser. No. 126,323, filed Mar. 19, 1971, which is a continuation of application Ser. No. 738,116, filed June 19, 1968, both now abandoned.

The present invention relates to the production of crystalline aluminosilicates, and more specifically to improved methods for rapidly and efficiently producing crystalline zeolites from aqueous mixture of alumina, silica and alkali metal hydroxide.

It is generally known that crystalline aluminosilicates, frequently referred to as molecular sieves or crystalline zeolites, may be synthetically prepared from alkaline mixtures of silica and alumina. For example, in the preparation of synthetic faujasite, i.e. Type X and type Y molecular sieves, the prior art discloses methods which involve preparing alkaline mixtures of required alumina and silica precursor material, and aging the mixture at various temperatures for a period of 1 to 2 days.

While prior methods have prepared synthetic crystalline zeolites of good quality, the extended production times required for their preparation has made these materials relatively expensive.

It is therefore an object of the present invention to provide a more rapid and efficient method for preparing crystalline aluminosilicate zeolites.

It is another object to provide a method for preparing synthetic faujasite in a fraction of the production time heretofore required.

It is still another object to provide a method for rapidly and economically producing synthetic faujasite having a high silica-alumina ratio from relatively inexpensive raw materials.

These and further objects of the present invention will become readily apparent to one skilled in the art from the following detailed description and specific examples.

Broadly, our invention comprises a method for preparing crystalline aluminosilicate zeolites which involves seeding an alkaline precursor mixture of alumina and silica with small size zeolite seeds having an average particle size below about 0.1 micron, and subsequently reacting the mixture to obtain substantial yields of crystalline zeolite.

More specifically, we have found that the processing time required to obtain substantial yields of crystalline aluminosilicate zeolite may be drastically reduced by adding as little as from about 0.1 percent to about 10 percent by weight of an extremely finely divided zeolite seeds having particle size below about 0.1 micron to a precursor mixture of alkali metal hydroxide, alumina and silica.

While it is contemplated that from about 0.1 to 10% by weight of seed particles will yield the most economical results under most circumstances, amounts in excess of 10% may be used if desired. However, amounts in excess of 10% do not substantially increase the formation rate of product. For example, it is found that by using the aforementioned minor amounts of seed particles which represent only about 0.1 to 10 percent by weight of the desired final product, an aging or crystallization period of only about 10 to 30 minutes is required to obtain substantially theoretical yields of faujasite having a silica to alumina ratio of about 2 to 4. Furthermore, it is found that by using our present seeding technique, synthetic faujasite having a silica to alumina ratio in excess of 4 may be readily obtained using inexpensive alkali metal silicate solutions as a source of silica.

The small size zeolite seeds utilized in the present seeding technique possess a composition similar to that of the zeolite being produced. Typically, these small sized seed particles may be of the general formula assigned to synthetic faujasite. Synthetic faujasite which is frequently referred to as Type X or Type Y molecular sieve depending upon the silica to alumina ratio thereof, may be prepared in the form of extremely fine sized particles using techniques generally disclosed in previously filed U.S. applications 624,997, filed Mar. 22, 1967, and 633,-355, filed Apr. 21, 1967, both now abandoned, and incorporated by reference herein.

In one preferred embodiment of the invention the seed particles are highly crystalline in nature and may be described as representing the final product of the afore-referred to applications. However, it is also contemplated that the seed particles may possess a relatively low degree of crystallinity, and may be typically obtained by the techniques of the aforementioned applications wherein the aging period (wherein crystals are formed) is decreased.

The aqueous precursor mixtures of silica, alumina and alkali metal hydroxide are prepared using ratios of ingredients required to produce the desired zeolite product. In the case of synthetic faujasite, for example, the ratio of silica to alumina will vary according to the silica to alumina ratio desired in the final product. For typical preparations of Type X synthetic faujasite, that is where the final silica to alumina ratio will be from about 2.0 to 3.0, the following ratios or concentrations of ingredients are generally followed:

$SiO_2/Al_2O_3$ ———————————————— 3 to 5
$M_2O/SiO_2$ ———————————————— 1.2 to 1.5
$H_2O/Na_2O$ ———————————————— 35 to 60

When it is desired to produce synthetic faujasite which falls within the Y range, that is where the final product possesses a silica to alumina ratio of 3.0 to 7.0, several ranges of ingredients may be used. Some typical examples are:

|  | 1 | 2 | 3 | 4 |
|---|---|---|---|---|
| $SiO_2/Al_2O_3$ | 7–40 | 10–30 | 7–30 | 8–30 |
| $M_2O/SiO_2$ | 2–.4 | .4–.6 | .6–.8 | .6–10 |
| $H_2O/Na_2O$ | 25–60 | 20–60 | 20–60 | 12–90 |

In the above formulae, wherein the alkali metal cation is indicated as M, it is to be understood that while the preferred alkali metal is sodium, other alkali metal cations such as potassium, lithium and so forth, may sometimes be used.

The precursor mixtures which contain water, alkali metal hydroxide, silica and alumina are prepared using conventional mixing techniques and starting materials such as sodium silicate and sodium aluminate. Other sources of silica and alumina may include alumina gel, aluminum salts, silica gel and silica sol. In general these mixtures are maintained at a temperature of from about 25° to about 110° C. and are found to remain stable for reasonable periods.

Subsequent to preparing the precursor zeolite mixtures the mixture is combined with from about 0.1 to 10 percent by weight of zeolite seeds. The mixing procedure used in combining the seed crystals with the precursor mixture should be one which results in a rapid and thorough dispersion of the seeds throughout the mixture. While it is generally contemplated that from about 0.1 to about 10 percent by weight (based on the weight of the final theoretical yield of zeolite product) is generally utilized in the present technique, it should be understood that in excess of 10 percent by weight seed crystals may be utilized to obtain a similar result. However, amounts of seed crystals in excess of about 10 percent do not increase the rate of zeolite production in proportion to the economic value of the additional seed material. Likewise while less than 0.1 percent by weight of seed crystals may be used, it is generally found that the rate of production decreases rapidly when less then about 0.1 percent by weight of seed crystals is utilized.

The slurry of precursor mixture and seed crystals is subsequently maintained at a temperature of from about 60° to about 110° C. for a period generally ranging from about 10 minutes to 4 hours, however longer reaction periods may be employed if desired. It is found that during this reaction period the desired crystalline zeolite forms in yields which approach the theoretical yield expected from the starting materials present in the precursor solution. The reaction period may be conducted at a relatively uniform temperature or if desired, the period may be conducted at a series of different temperatures. That is, the prepared slurry may be first aged at a temperature of from 25 to 40° C. for a period of 10 minutes to 24 hours, and subsequently heated to a higher temperature of from about 40 to about 110° C. for a period of about 10 minutes to 4 hours. It is also to be understood that the aging-reaction period may be conducted while the temperature is continuously varied.

Subsequent to reaction the resultant crystallized product is recovered by any convenient technique which may involve filtration or centrifuging. The recovered product is preferably washed to remove excess reactants, and subsequently may be dried or used in the form of an aqueous slurry. The crystalline zeolites prepared in accordance with the present invention have many applications including ingredients in catalysts and as absorbents.

Having described the basic aspects of the present invention the following examples are given to illustrated specific embodiments thereof.

EXAMPLE I

Zeolite seeds were prepared by the following procedures:

(A) 29 g. of sodium aluminate ($Na_2O.Al_2O_3.3H_2O$) was dissolved in 368 g. $H_2O$. A sodium silicate solution comprising 420 g. of sodium silicate (28.5% $SiO_2$; 8.7% $Na_2O$), 112 g. NaOH and 100 g. $H_2O$ was prepared. These solutions were cooled to 0° C., mixed, and aged with stirring to 1 hour at 0° C. The mixture was then aged without stirring at 20° C. for 16 hours. The mixture was heated at 90 to 100° C. for 6 hours and the product was recovered by filtration and washed. The product possessed the crystalline structure of Type X zeolite and a silica to alumina ratio of about 2.5. The particle size of the product was between 0.01 to 0.05 micron. The nitrogen surface area was 720 m.$^2$/g.

(B) The procedure set forth in A above was repeated, however, the heating period at 90–100° C. was eliminated and the 20° C. aging period was reduced from 16 hours to about 4 hours. The resultant zeolite seed product possessed a particle size of below about 0.01 micron, a silica to alumina ratio of about 2.5, and no detectable crystallinity.

EXAMPLE II

In the runs tabulated below various ratios of reactants, i.e. $Na_2O$, $Al_2O_3$, $SiO_2$, $H_2O$ using sodium hydroxide, commercial sodium silicate ($Na_2O.3.3SiO_2$), and sodium aluminate, were combined with 0.5% by weight of seed particles A or B prepared in Example I. The preparation procedure involved combining the reactants, aging for 16 hours at 20° C., and aging 4 hours at about 90–110° C. The resultant zeolite particles possessed a silica to alumina ratio of about 5.0 to 6.0 and the crystalline structure of faujasite.

TABLE I

| Run | Composition of reaction mix (moles) | | | | Seeds (A or B) | Surface area (m.²/g.) | Unit cell (A°) | Comments |
|---|---|---|---|---|---|---|---|---|
| | $Na_2$ | $Al_2O_3$ | $SiO_2$ | $H_2O$ | | | | |
| 1 | 3.8 | 1 | 9.5 | 136 | A | 910 | 24.67 | Good Y. |
| 2 | 3.9 | 1 | 10.0 | 140 | B | 892 | | Do. |
| 3 | 4.1 | 1 | 10.5 | 144 | A | 835 | | Do. |
| 4 | 4.2 | 1 | 11. | 148 | B | 893 | | Do. |
| 5 | 4.4 | 1 | 11.5 | 152 | A | 77 | | Do. |
| 6 | 4.5 | 1 | 12.0 | 156 | B | 710 | 24.63 | Do. |
| 7 | 4.6 | 1 | 12.5 | 160 | A | 533 | | Fair Y. |
| 8 | 4.8 | 1 | 13.0 | 164 | B | 224 | | Poor Y. |
| 9 | 4.9 | 1 | 13.5 | 168 | A | 151 | | Do. |
| 10 | 5.1 | 1 | 14.0 | 172 | B | 83 | | Do. |
| 11 | 5.2 | 1 | 14.5 | 176 | A | 64 | | Do. |

EXAMPLE III

A series of runs were made in a manner similar to that set forth in Example II, however, the 16 hour at 20° C. aging period was omitted. Where applicable, the concentration of zeolite seeds was again 0.5% by weight of the theoretical weight of the finished zeolite product (based on $Al_2O_3$). It is to be particularly noted that when the zeolite seeds were omitted, no zeolite formation occurred. (Run 1). Thus it is seen the present process provides a method for obtaining high silica faujasite, i.e. silica to alumina ratio of 5.0, without including an external cold aging step.

TABLE II

| Run | Composition of reaction mix (moles) | | | | Seeds (A or B) | Surface area (m.²/g.) | Unit cell (A°) | Comments |
|---|---|---|---|---|---|---|---|---|
| | $Na_2$ | $Al_2O_3$ | $SiO_2$ | $H_2O$ | | | | |
| 1 | 3.8 | 1 | 9.5 | 136 | None | | | No product. |
| 2 | 3.8 | 1 | 9.5 | 136 | A | 683 | | Good Y. |
| 3 | 3.9 | 1 | 10.0 | 140 | B | 648 | | Do. |
| 4 | 4.1 | 1 | 10.5 | 144 | A | 713 | | Do. |
| 5 | 4.2 | 1 | 11.0 | 148 | B | 697 | | Do. |
| 6 | 4.4 | 1 | 11.5 | 152 | A | 734 | | Do. |
| 7 | 4.5 | 1 | 12.0 | 156 | B | 673 | 24.62 | Do. |
| 8 | 5.6 | 1 | 12.5 | 160 | A | 415 | | Fair Y. |
| 9 | 4.8 | 1 | 13.0 | 164 | B | 134 | | Poor Y. |
| 10 | 4.9 | 1 | 13.5 | 168 | A | 64 | | Do. |
| 11 | 5.1 | 1 | 14.0 | 172 | B | 43 | | Do. |
| 12 | 5.2 | 1 | 14.5 | 176 | A | 45 | | Do. |

EXAMPLE IV

A series of runs were made using a reaction ratio of $Na_2:Al_2O_3:SiO_2:H_2O$ of 4.2:1:3:180 using a solution prepared from sodium aluminate, sodium hydroxide and sodium silicate. Various seeding levels using seeds prepared by way of the procedures set forth as A in Example I. The aging periods conducted both at 20° C. and reflux (90–110° C.) were also varied. The products obtained were identified as faujasite having a silica to alumina ratio of about 2.5.

TABLE III

| Run | Seeds (percent by wt.) | Aging 20° C. | Aging 90–110° C. | Surface area (m.²/g.) |
|---|---|---|---|---|
| 1 | 0 | None | None | 62 |
| 2 | 1 | do | do | 61 |
| 3 | 5 | do | do | 37 |
| 4 | 0 | do | 10 minutes | 31 |
| 5 | 1 | do | do | 72 |
| 6 | 5 | do | do | 19 |
| 7 | 0 | do | 30 minutes | 33 |
| 8 | 1 | do | do | 765 |
| 9 | 5 | do | do | 739 |
| 10 | 0 | do | 4 hours | 88 |
| 11 | 1 | do | do | 780 |
| 12 | 5 | do | do | 747 |
| 13 | 0 | 16 hours | None | 45 |
| 14 | ¹1 | do | do | 38 |
| 15 | ²1 | do | do | 40 |
| 16 | ¹5 | do | do | 35 |
| 17 | ²5 | do | do | 42 |
| 18 | 0 | do | 10 minutes | 39 |
| 19 | ¹1 | do | do | 31 |
| 20 | ²1 | do | do | .703 |
| 21 | ¹5 | do | do | 185 |
| 22 | ²5 | do | do | 722 |
| 23 | 0 | do | 30 minutes | 187 |
| 24 | ¹1 | do | do | 810 |
| 25 | ²1 | do | do | 740 |
| 26 | ¹5 | do | do | 710 |
| 27 | ²5 | do | do | 810 |
| 28 | 0 | do | 4 hours | 843 |
| 29 | ¹1 | do | do | 805 |
| 30 | ²1 | do | do | 700 |
| 31 | ¹5 | do | do | 712 |

¹ Seed added before 20° C. aging.
² Seed added after 20° C. aging.

EXAMPLE V

To further illustrate the effect of adding 1% seeds to the preparation of Example IV, runs were made wherein the product was sampled at various 90–110° C. aging times up to 30 minutes. No 20° C. aging period was used.

| Run | Reflux time (min.) | Surface area m.²/g. 1% seeds | Surface area m.²/g. No seeds |
|---|---|---|---|
| 1 | 5 | 16 | |
| 2 | 10 | 115 | 31 |
| 3 | 15 | 369 | |
| 4 | 20 | 715 | |
| 5 | 30 | 737 | 33 |

The above examples clearly indicate that substantial yields of synthetic crystalline zeolites may be rapidly and efficiently prepared in accordance with the invention set forth herein.

We claim:
1. A method for preparing a crystalline aluminosilicate zeolite which comprises:
   (1) preparing an aqueous precursor mixture of silica, alumina and alkali metal hydroxide, the proportions of said silica, alumina and alkali metal hydroxide being those required to produce the desired zeolite;
   (2) adding to said precursor mixture from about 0.1 to about 10 percent by weight based on the weight of the theoretical yield of desired zeolite of amorphous aluminosilicate zeolitic nucleation centers having a particle size below about 0.1 micron; and
   (3) reacting the mixture at a temperature of about 60 to 150° C. for a period of time sufficient to produce a substantially theoretical yield of crystalline zeolite.
2. The method of claim 1 wherein the zeolite is synthetic faujasite.
3. The method of claim 2 wherein the zeolite is type X.
4. The method of claim 2 wherein the zeolite is type Y.
5. The method of claim 2 wherein the reacting period ranges from about 5 minutes to 4 hours.
6. The method of claim 2 wherein the average particle size of said finely divided nucleation centers ranges from about 0.01 to about 0.1 microns.
7. The method of claim 2 wherein the alkali metal hydroxide is sodium hydroxide.
8. The method of claim 4 wherein the silica to alumina ratio of the zeolite is greater than about 4.
9. The method of claim 8 wherein the silica is derived from soluble sodium silicate.
10. The method of claim 9 wherein the silica to alumina ratio of the zeolite is greater than about 4.5.

References Cited
UNITED STATES PATENTS

| 2,882,244 | 4/1959 | Milton | 423—328 |
| 2,979,381 | 4/1961 | Gottstine et al. | 423—329 |
| 3,119,660 | 1/1964 | Howell et al. | 423—118 |
| 3,071,434 | 1/1963 | Frilette et al. | 423—329 |
| 3,321,272 | 5/1967 | Kerr | 423—329 |
| 3,433,589 | 3/1969 | Ciric et al. | 423—329 |
| 3,516,786 | 6/1970 | Maher et al. | 423—329 |
| 3,574,538 | 4/1971 | McDaniel et al. | 423—329 |
| 3,639,099 | 2/1972 | Elliott et al. | 423—329 |

EDWARD J. MEROS, Primary Examiner

U.S. Cl. X.R.

423—118

UNITED STATES PATENT OFFICE
CERTIFICATE OF CORRECTION

Patent No. 3,808,326                     Dated April 30, 1974

Inventor(s) Carl V. McDaniel, Philip K. Maher and Joseph M. Pilato

It is certified that error appears in the above-identified patent and that said Letters Patent are hereby corrected as shown below:

"In Column 1, line 3:

"Carl V. McDaniel, Laurel, Philip K. Mather, Baltimore,"

should read:

"Carl V. McDaniel, Laurel, Philip K. Maher, Baltimore,"

Signed and sealed this 10th day of September 1974.

(SEAL)
Attest:

McCOY M. GIBSON, JR.                    C. MARSHALL DANN
Attesting Officer                       Commissioner of Patents